United States Patent Office 3,535,011
Patented Oct. 20, 1970

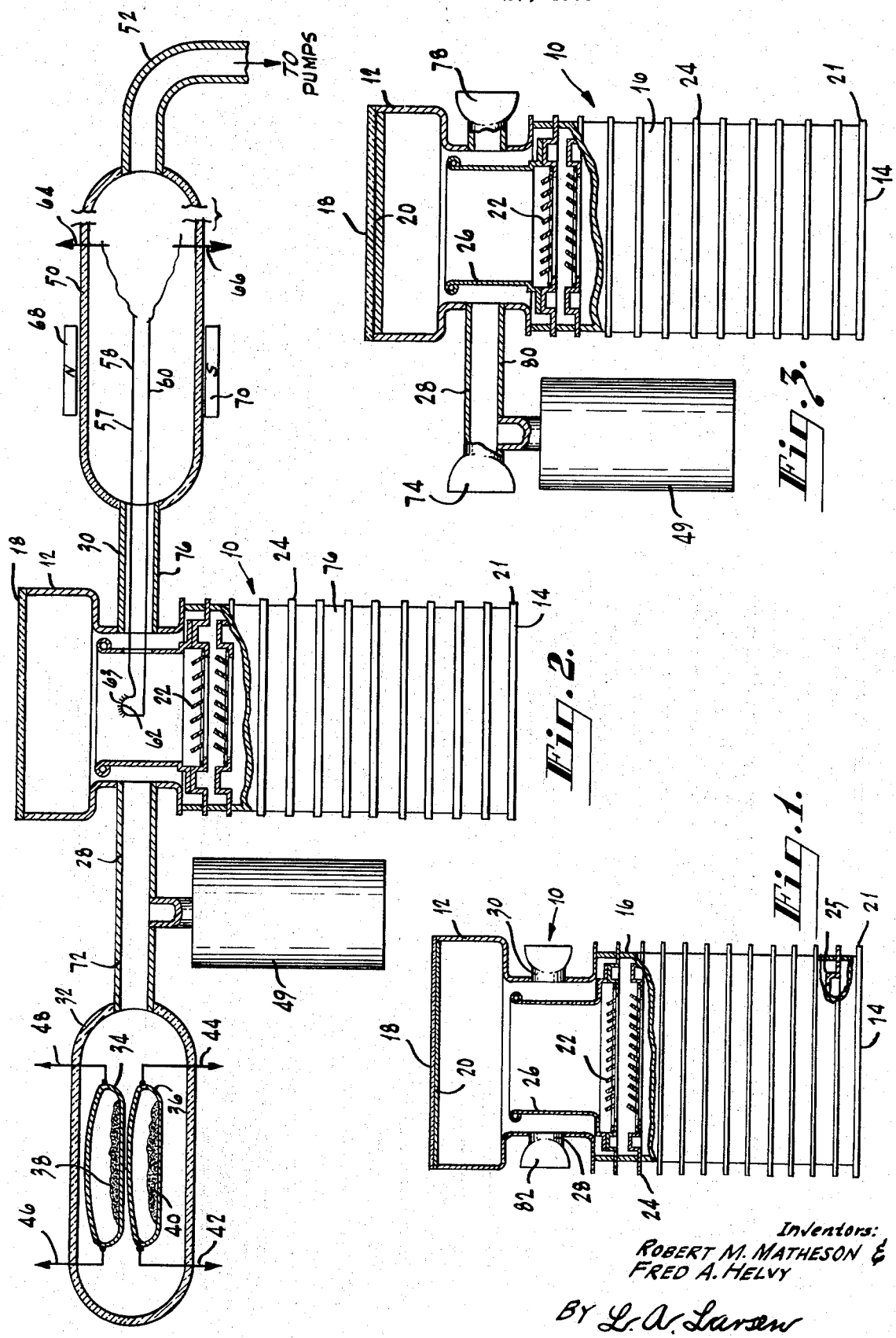

3,535,011
METHOD OF MAKING PHOTOEMISSIVE ELECTRON TUBES
Robert M. Matheson and Fred A. Helvy, Lancaster, Pa., assignors to RCA Corporation, a corporation of Delaware
Filed Feb. 27, 1968, Ser. No. 708,662
Int. Cl. B29h 5/00
U.S. Cl. 316—6        9 Claims

ABSTRACT OF THE DISCLOSURE

Method of making a photomultiplier tube for use in relatively high temperature environments of up to about 200° C. The method of manufacture includes the terminal steps of afterbaking the tube first at a temperature of about 135° C., then at a temperature of about 145° C. and lastly at a temperature of about 175° C. Each of the baking steps is continued for about 100 hours. During the several baking steps the tube is connected to an ion pump for continuous evacuation. After the third terminal baking step, the exhaust tubulation of the tube is hermetically closed. The method also includes forming the envelope of the tube of ceramic and metal in order to withstand the relatively high processing and use temperatures.

BACKGROUND OF THE INVENTION

Field of the invention

This invention relates to a method of making photoemissive electron tubes and particularly to a method of making photoemissive electron tubes that will withstand relatively high temperatures in operation.

Description of the prior art

One type of photoemissive electron tube in connection with which use at relatively high temperatures is desirable, is a photomultiplier. This type of tube includes a glass envelope having therein a photoemissive cathode, a collector, and several electron multipliers positioned between the photoemissive cathode and the collector.

Areas where photoemissive electron tubes of this type would find advantageous use if they were capable of withstanding high temperatures, include will logging and space applications. Such use involves exposure to temperatures of from minus 196° C. to about 200° C. for appreciable lengths of time.

Present photoemissive devices cannot tolerate such temperatures for any appreciable length of time. At the higher temperatures, gases, primarily hydrogen, are released by internal tube parts. The evolution of such gases in the range including the relatively high temperatures aforementioned, occurs as a consequence of the fact that the outgassing temperature and time employed during manufacture of the devices has not been sufficient to completely outgas the internal elements. After forming the photocathode, the maximum temperature of the tube has been restricted heretofore to 75° C. It was believed that the photocathode would decompose at a temperature higher than that indicated. Furthermore, it was thought that the tube would be harmed if subjected to higher temperatures as a consequence of ionic conduction in the glass envelope and absorption by the envelope and internal tube parts, of alkali metals used in forming the photocathode.

SUMMARY OF THE INVENTION

In accordance with the present disclosure, there is provided an improved method of making a photoemissive electron tube, which method includes an outgassing step after photocathode formation at temperatures as high as 175° C. without induced adverse effects. Our discovery of the feasibility of employing such high temperature during terminal outgassing is accompanied by several advantages. Not only does it permit photoemissive tubes to be used in relatively high temperature environments such as are found in well logging and space applications, but in addition, photoemissive tubes so processed have shown appreciable improvement in their general properties such as cathode sensitivity, cathode uniformity, and pulse height resolution.

The feasibility of employing appreciably higher outgassing temperatures than were thought tolerable heretofore after formation of the photocathode, is predicated upon our discovery that the photocathode is not harmed by exposure to such higher temperatures, but is indeed benefited thereby as indicated in the foregoing. Furthermore, we remove the temperature limitation imposed by glass formerly used as the envelope of the tube, by making the tube envelope of materials capable of tolerating relatively high temperatures.

BRIEF DESCRIPTION OF THE DRAWING

FIG. 1 is a partly sectional view of a photomultiplier electron tube made in accordance with the improved method herein disclosed;

FIG. 2 is a partly sectional view of apparatus that may be used in forming a photocathode upon the faceplate of a photoemissive electron tube and in evacuating the envelope of the tube; and FIG. 3 is a partly sectional view of a sealed assembly comprising a photomultiplier tube connected to an ionic afterpump and adapted to be placed in a baking furnace for terminal outgassing the internal parts of the tube while the tube is under evacuation.

DESCRIPTION OF THE PREFERRED EMBODIMENTS

In FIG. 1 is shown by way of example, a photomultiplier type of photoemissive electron tube 10 made in accordance with our improved method. The tube 10 has an envelope comprising metal portions 12, 14, insulating rings 16 made of a ceramic such as aluminum oxide, and a translucent faceplate 18 made of single or polycrystalline aluminum oxide, for example.

On the inner surface of the faceplate 18 is a photoemissive coating or layer 20 serving as a photoemissive cathode. The photoemissive layer 20 may comprise antimony, potassium and cesium. The metal portion 14 of the tube envelope serves as an end closure plate for the end of the tube opposite to the faceplate 18, and also as an anode or collector of electrons emitted by the photoemissive cathode 20. A flange 21 serves as a contact terminal for the collector 14.

Between the photoemissive cathode 20 and the collector 14 are disposed a plurality of arrays of dynodes 22 mounted on radially-extending annular metal flanges 24, ten dynode arrays being included in the tube shown in FIG. 1. The flanges 24 are sealed between adjacent rings 16 of insulating material by a suitable brazing material such as silver-copper eutectic alloy known in the art. A guard ring 25 is provided to prevent ohmic leakage from the final dynode array 22 to the anode 14. A portion of each flange 24 extends beyond the outer surfaces of the insulating rings 16 for service as contact means externally of the tube envelope. A metallic tubular focussing electrode 26 is mounted within the tube 10 on the flange 24 that supports the uppermost of the dynode arrays 22 as viewed in FIG. 1, so as to be disposed between the photoemissive cathode 20 and the several arrays of dynodes 22.

Tabulations 28, 30 communicating with the interior of the tube 10, and shown pinched off to form hermetically tight closures, are employed prior to pinch-off in performing the several steps of the method to be described. The tubulations 28, 30 may be made of a metal such as copper.

In carrying out the improved method of the invention, apparatus of the type shown in FIG. 2 may be used. The apparatus shown is employed to form the photoemissive layer 20 (FIG. 1) and to evacuate the interior of the tube 10. The further step of outgassing the internal elements of the tube 10 after formation of the photoemissive layer 20, will be explained in connection with FIG. 3.

As shown in FIG. 2, the tubulation 28 is sealed hermetically to a vessel 32 made of glass, for example, and which contains two metal channels 34, 36 which may be made of tantalum, for example. Channel 34 contains a charge 38 of cesium chromate, zirconium and tungsten powders from which cesium is evolved upon heating. Channel 36 contains a charge 40 of potassium chromate, zirconium and tungsten powders from which potassium is released upon heating. Each of channels 34, 36 has openings between spot welds (not shown) which allow the vapors of cesium and potassium respectively to be released during the heating thereof. Channel 36 is connected by leads 42, 44 to a suitable source of electric current (not shown) for heating the channel. Leads 46, 48 serve to connect channel 44 to a source of electric current (not shown) for heating this channel.

Also connected to the tubulation 28 is an ion pump 49 of a type available commercially. The pump communicates with the interior of the tube 10 by means of the tubulation 28.

The tubulation 30 on the other side of the tube 10 is hermetically sealed to one end of a vessel 50 which may be made of glass. The other end of the vessel 50 is connected by a tubulation 52 made of copper, for example, to one or more pumps (not shown).

Within the vessel 50 is disposed a filament 57 made of tungsten, for example, and having two legs 58, 60 which extend into the tube 10 where they are joined at one end at 62. The juncture region 62 includes a coating 63 of antimony which vaporizes when the region 62 is heated. For heating the region 62, the other ends of the legs 58, 60 are connected by means of terminals 64, 66 to a source (not shown) of suitable electric current. For moving the filament 57 from the vessel 50 to dispose the juncture region 62 thereof within the tube 10, a magnet system 68, 70 is employed. The magnet system is also used to remove the filament 57 from the tube 10 and from a portion of tubulation 30 to permit hermetic closure thereof as shown in FIGS. 1 and 3 after the antimony 63 has been evaporated.

In practicing the method herein disclosed with the use of the apparatus shown in FIG. 2 just described, the interiors of the vessels 32 and 50 and the tube 10 are evacuated through tubulation 52 by one or more pumps (not shown) to a pressure of about $10^{-7}$ torr. During the evacuation and prior to the formation of the photoemissive layer 20, the tube 10 is baked in an oven (not shown) at a temperature of about 360° C. for about one hour. The tube is then cooled to room temperature.

Thereafter, the filament 57 carrying at its juncture region 62 the coating or mass 63 of antimony, is heated by connecting leads 64, 66 to a suitable source of electric current (not shown) for evaporating the antimony. The antimony vapors so produced travel to the faceplate 18 and deposit on the inner surface thereof a layer of antimony.

Thereafter, the potassium-containing channel 36 is heated and potassium vapor is released therefrom. The potassium vapor migrates through the tubulation 28 and into the tube 10 and reacts with the antimony layer previously deposited on the faceplate 18. This step is carried out at a tube temperature of about 160° C. and is continued until the photosensitivity of the deposited antimony and potassium reaches a peak.

The cesium-containing channel 34 is then heated to release cesium vapor. The cesium vapor passes through the tubulation 28 and onto the previously-deposited antimony and potassium on the faceplate 18. This step is also carried out at a tube temperature of about 160° C. and is continued until the photosensitivity of the deposited antimony, potassium and cesium reaches a second peak.

The tube is then cooled to room temperature. The tubulation 28 is pinched off at a point 72 (FIG. 2) between the vessel 32 and the pump 49 to form an hermetic closure 74 as shown in FIG. 3. After removal of the filament 53 therefrom, the tubulation 30 is pinched off at a point 76 (FIG. 2) to form the hermetic closure 78 shown in FIG. 3. The formation of the closure pinches 74, 78 results in a severing of the tubulations 28, 30 and in separation of the vessels 32, 50 from the tube 10. The assembly remaining after such separation comprises the tube 10 and the ion pump 49 as shown in FIG. 3.

The assembly comprising the tube 10 and the ion pump 49 is then placed in an electric furnace (not shown) and with the ion pump operating, the assembly is heated to a baking temperature of about 135° C. for about 100 hours. After this period has expired, the temperature of the furnace is raised to about 145° C. and the assembly comprising the tube 10 and the ion pump 49 is exposed thereto for about 100 hours with the ion pump operating. The furnace is finally raised to a temperature of about 175° C. with the ion pump still attached but not operating and the tube is kept at this temperature for about 100 hours. The operation of the ion pump is not adversely effected by being subjected to the afterbaking temperatures aforementioned.

At the end of this final baking step, the tubulation 28 is hermetically closed by forming in the region 80 thereof (FIG. 3) a pinch-off 82 shown in FIG. 1. This results in a removal of the ion pump 49 from the tube 10. It is found that the pressure within the tube 10 after the final baking step has been reduced to a value which is believed to be about $10^{-12}$ torr and the internal parts of the tube have been degassed sufficiently to permit operation of the tube for extended periods of time, in environments having a temperature as high as 200° C. without any harmful evolution of gas within the tube or any other adverse effects.

On the contrary, it is found that the after or terminal baking steps described in the foregoing impart to the photoemissive tube important desirable characteristics such as improved cathode sensitivity, cathode uniformity and pulse height resolution.

While the aftorementioned heating steps produce the best results, we have found some improvement in respect of the temperature at which the tube can be used and the photocathode characteristics, when the afterbaking operation is carried out at temperatures lower than those specified in the foregoing. Thus, some improvement is attained with an afterbaking temperature as low as 100° C. and carried out during a period as short as one hour.

We claim:
1. Method of making a photoemissive electron tube having an envelope including a translucent faceplate, comprising:
   (a) forming a photocathode on the inner surface of said faceplate,
   (b) baking said tube after the formaton of said photocathode at a temperature from about 100° C. to about 175° C. for a period of at least one hour,
   (c) evacuating said tube during at least the initial portion of said period and discontinuing further evacuation during the terminal portion of said period, and
   (d) hermetically sealing said envelope.

2. Method according to claim 1 and wherein the time during which said tube is subjected to said baking temperature is at least 100 hours.

3. Method according to claim 1 and wherein the baking of said tube after the formation of the photocathode is performed at sequential temperature steps of about 135° C., about 145° C. and about 175° C.

4. Method according to claim 3 and wherein each of said temperature steps is carried out for about 100 hours.

5. Method according to claim 3 and wherein said tube is being further evacuated only during said temperature steps of about 135° C. and about 145° C.

6. Method of making a photomultiplier tube having a photocathode comprising the steps of:
 (a) forming an envelope including a translucent faceplate adapted to withstand without adverse effects processing temperatures after formation of the photocathode of up to about 175° C. and operating temperatures up to about 200° C. for extended periods of time,
 (b) evacuating said envelope to a pressure intermediate atmospheric pressure and about $10^{-12}$ torr,
 (c) depositing a layer of photoemissive material on the inner surface of said faceplate, then
 (d) after baking said envelope at a temperature of from about 100° C. to about 175° C. for at least one hour, and
 (e) evacuating said envelope during at least the initial portion of said afterbaking step to a pressure of about $10^{-12}$ torr and discontinuing further evacuation during the terminal portion of said period.

7. Method of making a photomultiplier tube comprising the steps of:
 (a) forming a tubular envelope of stacked rings of ceramic material with metal flanges between the rings and with portions of said flanges extending into said envelope,
 (b) sealing said rings to said flanges,
 (c) mounting electrodes on said portions of said flanges,
 (d) closing one end of said envelope with a translucent faceplate made of crystalline aluminum oxide,
 (e) closing the other end of said envelope with a metal plate,
 (f) depositing a layer of photoemissive material on the inner surface of said faceplate, then
 (g) afterbaking said envelope at a temperature of from about 100° C. to about 175° C. for at least one hour for outgassing said electrodes, and
 (h) evacuating said envelope during said afterbaking step at a temperature below about 145° C.

8. Method of making a photomultiplier tube having a tubular envelope closed at one end by a translucent faceplate and at the other end by a metal plate and having a plurality of dynode arrays between said faceplate and said metal plate, comprising the steps of:
 (a) forming a photoemissive layer on the inner surface of said faceplate including antimony, potassium and cesium, then
 (b) baking said envelope for a period of at least one hour at a temperature of from about 100° C. to about 175° C. while simultaneously evacuating said envelope to a pressure of about $10^{-12}$ torr during at least the initial portion of said period and discontinuing further evacuation during the terminal portion of said period, and
 (c) hermetically sealing said envelope.

9. Method according to claim 8 and wherein said baking step is carried out for a period of from about one hour to about 300 hours.

References Cited
UNITED STATES PATENTS

| | | | |
|---|---|---|---|
| 1,568,694 | 6/1926 | Ruggles | 316—6 XR |
| 1,843,728 | 2/1932 | Mesick | 316—6 XR |
| 2,431,401 | 11/1947 | James | 316—6 XR |
| 2,914,690 | 11/1959 | Sommer | 316—6 XR |

H. A. KILBY, Jr., Primary Examiner